(12) United States Patent
Egawa et al.

(10) Patent No.: US 6,697,863 B1
(45) Date of Patent: Feb. 24, 2004

(54) METHOD AND PACKET-PROCESSING DEVICE FOR USE IN AN ACTIVE NODE INCLUDED IN AN ACTIVE NETWORK TO ALLOCATE A SEQUENCE OF PACKETS RECEIVED BY THE ACTIVE NODE

(75) Inventors: Takashi Egawa, Tokyo (JP); Koji Hino, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/390,259

(22) Filed: Sep. 3, 1999

(30) Foreign Application Priority Data

Sep. 3, 1998 (JP) .......................................... 10-250063

(51) Int. Cl.⁷ .............................................. G06F 13/00
(52) U.S. Cl. ........................................ 709/226; 709/236
(58) Field of Search ................................ 709/226, 236

(56) References Cited

U.S. PATENT DOCUMENTS 5,859,835 A * 1/1999 Varma et al. ................ 370/229
6,438,134 B1 * 8/2002 Chow et al. ................. 370/412

OTHER PUBLICATIONS

IEEE Communications Magazine, Jan., 1997, vol. 35, No. 1, pp. 80–86 "A Survey of Active Network Research," Tennenhouse et al.

"ANTS: A Toolkit for Building and Dynamically Deploying Network Protocols" (David J. Wetherall, et al.), Proceedings in IEEE OPENARCH '98, pp. 117–129).

"PLAN: A Packet Language for Active Networks" (Michael Hicks, et al.), scheduled to contribute to International Conference on Functional programming (ICFP), 1998 and to have opened at http://www.cis.upenn.edu/~switchware as of Jun. 1, 1998.

* cited by examiner

Primary Examiner—Kenneth R. Coulter
(74) Attorney, Agent, or Firm—Dickstein, Shapiro, Morin & Oshinsky, LLP.

(57) ABSTRACT

Method and device for use in an active node included in an active network to allocate a sequence of packets received by the active node are provided. At first, the node receives each packet of the sequence and allocates each packet to a part of the resources by processing the packet sequence. Next, the node schedules a duration available for the part of the resources and measures the duration. And finally, the node releases the part of the resources with the remaining parts of the resources unreleased.

6 Claims, 6 Drawing Sheets

| PACKET ID | RESOURCE ALLOCATION STATE | DURATION CLOCK |
|---|---|---|
| 1234 | INPUT BUFFER ID=1, MEMORY AREA ID=5 | 10087 |
| 1235 | INPUT BUFFER ID=3, MEMORY AREA ID=6 | 10089 |
| ... | ... | ... |

FIG. 2

| SESSION ID | INFORMATION |
|---|---|
| 13006 | STATE=32 |
| 2364 | If(a3)then(congestion_flag=1)else(congestion_flag=0) |
| 32461 | con:=1,flowID=3,frame=662 |
| ⋮ | ⋮ |

FIG. 3

 ERROR DETECTION START SIGNAL AND AREA LENGTH INFORMATION SIGNAL
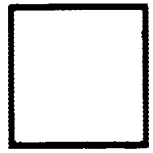 PROGRAM
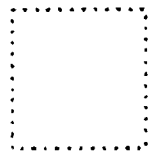 CHECK CODE
 DATA

METHOD AND PACKET-PROCESSING DEVICE FOR USE IN AN ACTIVE NODE INCLUDED IN AN ACTIVE NETWORK TO ALLOCATE A SEQUENCE OF PACKETS RECEIVED BY THE ACTIVE NODE

BACKGROUND OF THE INVENTION

This invention relates to nodes of packet-switched networks, particularly active nodes of active networks. In this specification, active nodes and active network means as the sense in "A Survy of Active Network Research" (David L. Tennenhouse, Jonathan M. Smith, W. David Sincoskie, David J. Wetherall, and Gray J. Minden, IEEE Communicarions Magazine, Vol. 35, No. 1, pp. 80–86. January 1997). In an active network, the routers or switches perform customized computations on the messages flowing through them. Active networks are active in the sense that nodes can perform computations on, and modify, the packet contents. In addition, this processing can be customized on a per user or per application basis.

When a packet-processing device receives a packet, the device allocates its resources (CPU time, memory and others) for the packet and then the packet is processed (like as transmission, cancellation, et al). Consquently, a reckless process may cause waste of the resources.

It is important to avoid the waste of the resources especially for the active network that adopts a capsule approach to realize the active network. The capsule approach replaces the passive packets of conventional architectures with active miniature programs that arm encapsulated in transmission frames and executed at each node along their path, and permits end users to describe the way to process a packet in the packet itself. If an end user misdescribes the program in the capsule, or the packet is transmitted incorrectly in the path, then the resources may be wasted by a reckless process.

"ANTS: A Toolkit for Building and Dynamically Deploying Network Protocols" (David J. Wetherall, John Guttag, and David L. Tennenhouse, Proceedings of IEEE OPEN-ARCH '98, pp.117–129) is described below. Packets contain descriptions of the maximum resources available for them in the lifecycle from the source node to the destination node, and if a packet uses resources over the maximum resources, the packet is unavailable for the resources. As the result, the amount of the resources that allocated for a packet in the network is limited.

"PLAN: A packet Language for Active Networks" (Michael Hicks, Pankaj Kakkar, Jonathan T. Moore, Carl A. Gunter and Scott Nettles scheduled to contribute to International Conference on Functional Programming (ICFP) 1998 and have opened at http://www.cis.upenn.edu/~switchware as of Jun. 1, 1998) explains a language specification for describing the way of processing packets. This specification includes limitations to deny loop statement. As the result, this technique avoid endless usage of resources by a packet.

In conventional packet-switched networks like as IP version 4 and ATM (Asynchronous Transfer Mode), a packet has a header that prescribes the way of processing the packet itself. The packet contains check code that corresponds to the whole of the header to chock and correct transmission errors.

Conventional packet-switched networks mentioned above have some problems.

Firstly, it is difficult to limit the amount of resources of one node for a packet to be suitable for high speed processing.

For rapid processing of packets, a packet-processing device should allocate appropriate amount of the resources (for example, CPU time, memory, etc.) to each packet. When the amount of resources is not predetermined for the packet, it is difficult to design the packet-processing device. Particularly, this problem becomes serious in the network that packets are processed in ping.

On the other hand, to limit the amount of resources allocated for a packet in its lifecycle may consume large amount of resources. For example, a top packet-processing device in long path comprising many packet-processing devices incorrectly processes a packet with permission to be allocated large amount of resources.

Language specification can restrict the consumption volume of resources effectively. However, in this case high speed interpretation and also processing may become difficult when language specification becomes complicated.

Secondly, by establishing check code in a packet to the whole part that is prescribed the way of processing a packet to detect and correct transmission errors, a packet-processing device can not start to process the packet without finishing receiving the whole part This is not an important problem in the case that a processing method is prescribed to only a header part like the conventional packet switching such as IP and ATM because the size of the header is small.

However, in the case that the size of description about processing the packet may be large, like as the active network adopting capsule approach, the packet-processing device can not start process the description until the packet-processing device finishes receiving the description. Consequently, the time from the arrival of a packet to starting of processing the packet is long. Further, the size of buffer tends to be large in order to store large description.

SUMMARY OF THE INVENTION

In view of the problems mentioned above, the present invention provides packet-processing devices of active network adopting capsule approach that rapidly process packets.

According to an aspect of this invention, a method is for use in an active node included in an active network to allocate a sequence of packets received by the active node and comprises the steps of (1) receiving each packet of the sequence; (2) allocating each packet to a part of the resources by processing the packet sequence; (3) scheduling a duration available for the part of the resources; (4) measuring the duration; and (5) releasing the part of the resources with the remaining parts of the resources unreleased.

In this method, resource allocation concerned with the remaining packets is maintained at the step (5).

According to another aspect of this invention a method is for detecting an error in a sequence of packet received by an active node included in an active network and comprises the steps of: (1) receiving, at the active node, a packet comprising a plurality of parts each of which contains its check code for detecting an error; (2) finishing receiving a selected portion of the packet, and (3) checking at the active node by using the check code, without waiting for receiving the other portions of the packet.

In the above-mentioned method, the selected portion contains a code for designating a coding method of its check code and the active node checks the selected portion according to the coding method.

According to still another aspect of this invention, a packet-processing device is operable as an active node in an active network to allocate a packet to a resource and comprises a timing measuring unit for measuring a predetermined duration designated in the packet; and a release unit for releasing the resource when the predetermined duration designated in the packet lapses.

In the above-mentioned device, resource allocation concerned with other packets than the packet is maintained even if the predetermined duration designated in the packet lapses.

According to yet another aspect of this invention, a packet-processing device is operable as an active node in an active network to allocate a sequence of packets to resources coupled to the active node and comprises a packet input unit coupled to at least one input line, for detecting packet bounds of inputted packets; a resource manager for managing the resources by processing the packets; a resource management table for recording a relation between the packets and resources allocated the packets; a packet processor for processing packet contents of the packet sent from the packet input unit; and a packet output unit coupled to at least one output line, for outputting packets sent from the packet processor to the at least once output line. In this event, the packet-processing device is operable to process each packet according to the packet contents. On the other hand, the resource manager decides a finish time to finish processing each packet on the basis of a time determined by the packet input unit and recording the finish time in the resource management table while the packet processor discontinues processing packet contents at the finish time of each packet unless the packet processor finishes processing the packet In the above-mentioned device, the device further comprises a interpacket process manager for managing a relationship among the packets included in the packet sequence. Processing is continuously executed in the packet processor in connection with the packet contents of each packet which is managed by the interpacket process manager unless the packet processor finishes processing the packet.

According to another aspect of this invention, a packet-processing device is operable as an active node in an active network to process a packet divided into a plurality of parts each of which has a check code for detecting an error and comprises a receiving unit for receiving the packet; a detection unit for detection tie part and the check code included in the packet; and all operation unit for starting interpreting the part and the check code without waiting for the other parts than the part of the packet when the packet-processing device receives the part and the check code.

According to the above-mentioned device, an error is checked in the part of the packet by a calculation method determined by the packet contents.

BRIEF DESCRIPTION OF THE DRAWING

FIG. 2 shows an example of the data structure of resource management table 104;

FIG. 3 shows a data structure meaning the information;

DESCRIPTION OF THE PREFERRED EMBODIMENTS

(1) The First Embodiment

Figure 1:
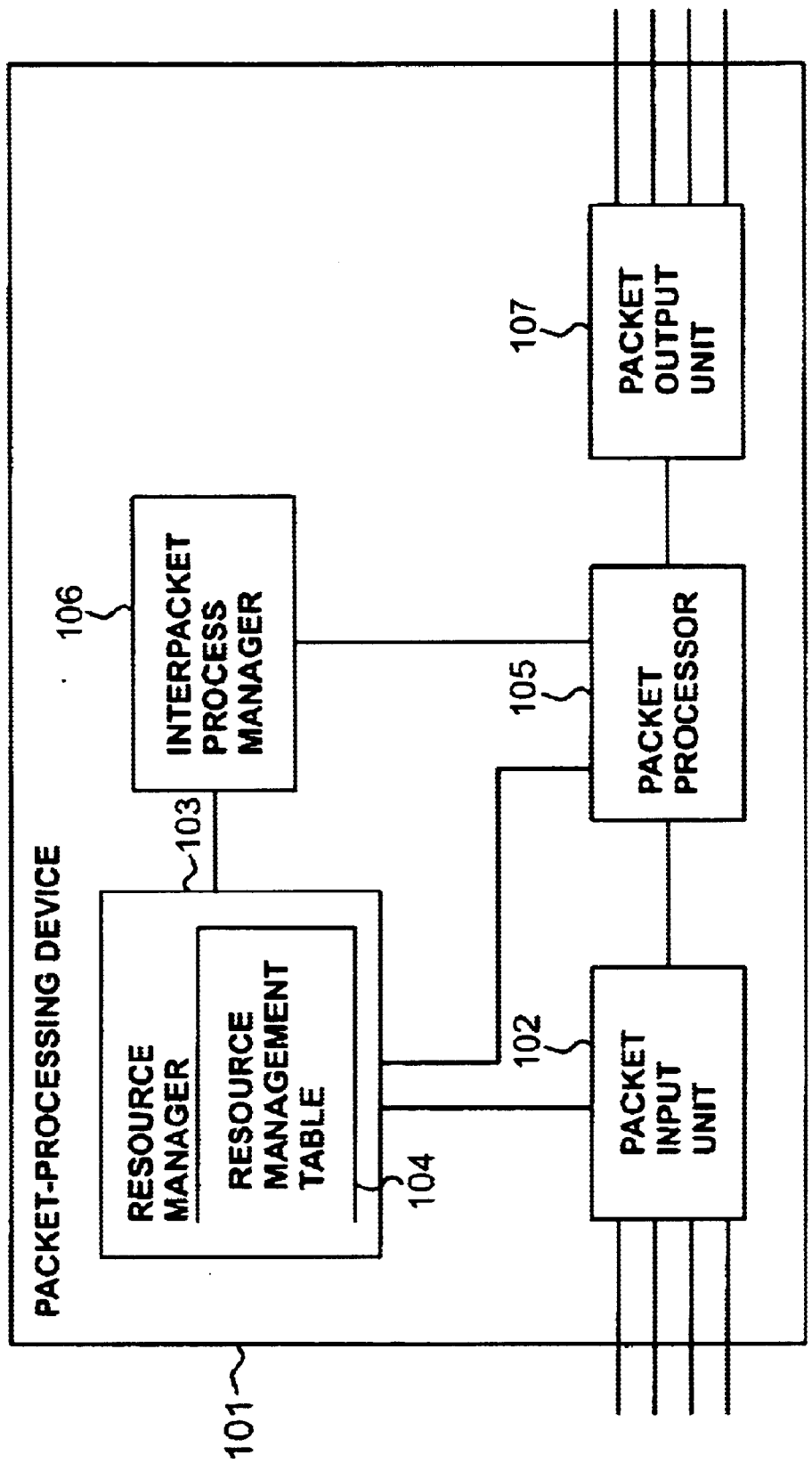
FIG. 1 shows a block diagram of the first embodiment of the present invention.

Referring to FIG. 1, description will be made about the first embodiment of the present invention.

The packet-processing device 101 is composed of a packet input unit 102, a resource manager 103, a resource management table 104, a packet processor 105, an inter-packet process manager 106, and also a packet output unit 107.

The packet input unit 102 is coupled to one or plural input lines from which this unit 102 receives packets. The packet input unit 102 identifies borders of the packets and transfer the packets to the packet processor 105.

The resource manager 103 controls resource usership available for each packet.

The resource management table 104 is controlled by the recourse manager 103 and stores the information representative of conditions that each packet uses resources.

FIG. 2 shows an example of the data structure of the resource management table 104. In FIG. 2, input buffer IDs and memory area IDs are designated as those conditions.

With reference to the resource management table 104, the packet processor 105 allocates the input buffers and memory area corresponding to a packet ID in order to process the packet designated by the packet ID.

The packet processor 105 interprets the description of cach of packets and processes transmission of packets, discard of packets, partly rewriting of a packet associated with transmission of a header such as TTL in IPv4, etc. Furthermore, the packet processor 105 decides an output port to be outputted in the case that packet-processing device 101 has plural output ports.

The interpacket process manager 106 manage the information for the cooperation between packets, like in session establishment.

Specifically, the interpacket process manager 106 manages information that is transmitted between packets. For example, the information is represented by a kind of value like a state or program code. FIG. 3 shows a data structure meaning the information.

The packet output unit 107 is coupled to one or plural output lines. The packet output unit 107 buffers packets processed by the packet processor 105 and supplies the packets as occasion demands to the output line.

Next, description will be made about the operation of the packet-processing device 101 with reference to FIG. 4.

When a packet reaches at the packet-processing device 101, the packet input unit 102 identifies the packet bound or border and gives a packet ID to the packet (STEP 401).

Then, the packet-processing device 101 starts two processes the first process is to executes the process encapsulated in the packet, and the second process is to watch whether the process encapsulated in the packet spends resources of the packet-processing device 101 too much.

The process encapsulated in a packet is executed at the packet processor 105 (STEP 402). The packet processor 105 interprets the process statement encapsulated in a packet. In the case that the packet comprises the header of IP version 4 for the process statement, the packet processor 105 interprets instructions in the packet contents, such as the destination of the packet in its header address, transmission error check of the header by CRC field, various kind of optional processing, et al. Next, the packet processor 105 execute the interpreted instruction and sends the packet to the packet output unit 107 in case of necessity. When the packet requests to cooperate with other packets (for example, establishment of session), the packet processor 105 instructs the interpacket process manager 106 to write/read data. Further, the packet output unit 107 sends the packet to a neighbor node with reference to the capacity of the output lines of the packet output unit 107 (STEP 403).

Figure 4:
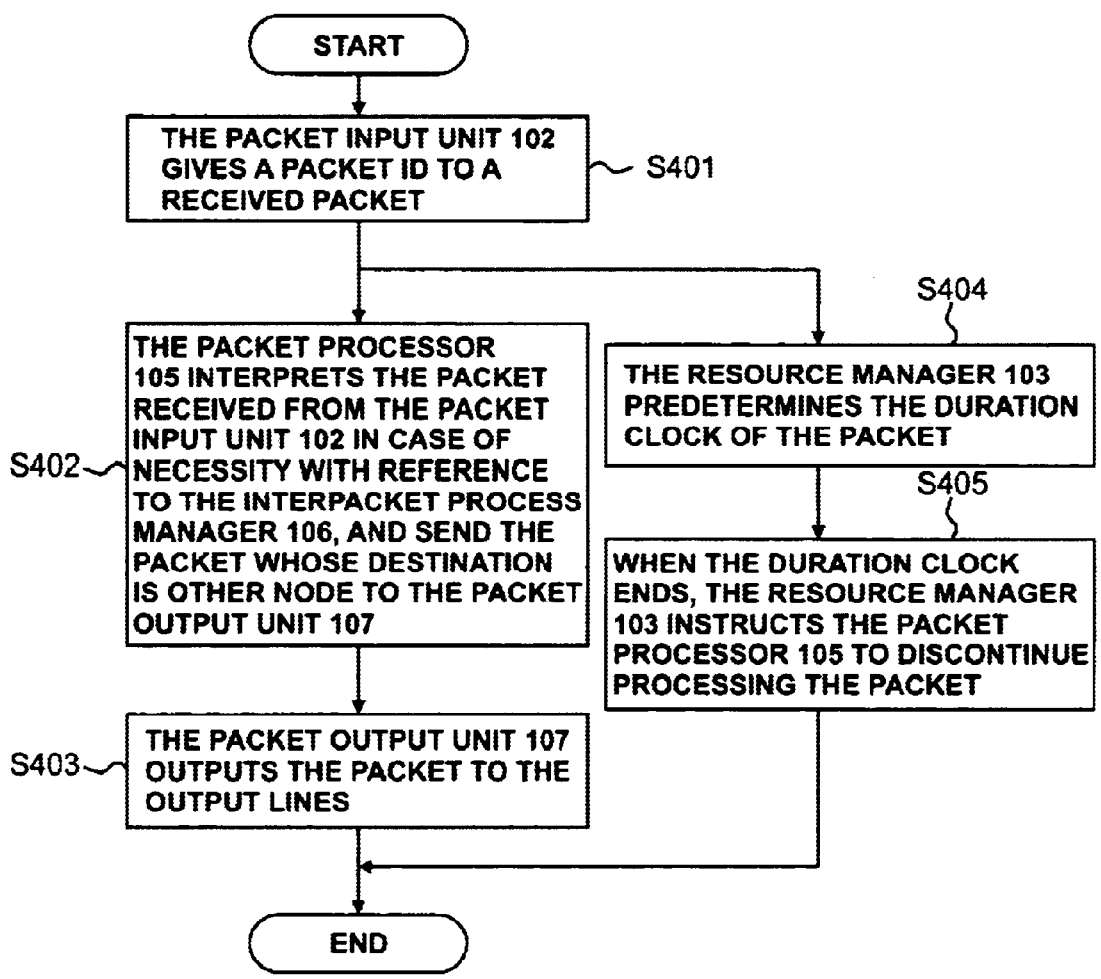
FIG. 4 shows a flow chart of the first embodiment.

Furthermore, FIG. 4 includes a sequence of steps to watch excessive allocation of resources for processing a packet. After STP 401, this sequence start, when the resource manager 103 writes, into the packet received at STEP 401, a packet ID, resource IDs which indicate resource to be allocated to process the packet, and the duration clock which indicates duration available for the packet to use allocated resources (STEP 404).

A resource to be allocated to process the packet means a CPU time, a memory for buffering, resistors etc which are allocated by the packet processor 105 during allocation processing. The duration clock is determined in the following manners.

(a) The duration clock is decided by the number of clocks appearing from the time that the packet input unit 12 receives the packet (b) The duration clock is decided by the number of clocks counted from the time that the end of the packet will reach at the packet input unit 102 and is calculated on the basis of size information of the packet from the lower layer.

(c) The duration time is decided by a multiple of a packet length equal to the number of clocks appearing after a leading area of a packet reaches at the packet input unit 102.

When the duration clock ends, the resource manager 103 directs the packet processor 105 to stop using the resource allocated for the packet (STEP 405) This direction releases the CPU time allocated for the packet. Also, this direction releases the allocated buffers so that the program in the packet is unable to access the buffers. As a result, execution of the program in the packet is discontinued after the packet is already sent to the packet output unit 107.

However, it is to be noted that the data managed by the interpacket process manager 106 as shown in FIG. 3 are maintained.

(2) The Second Embodiment

Figure 5:
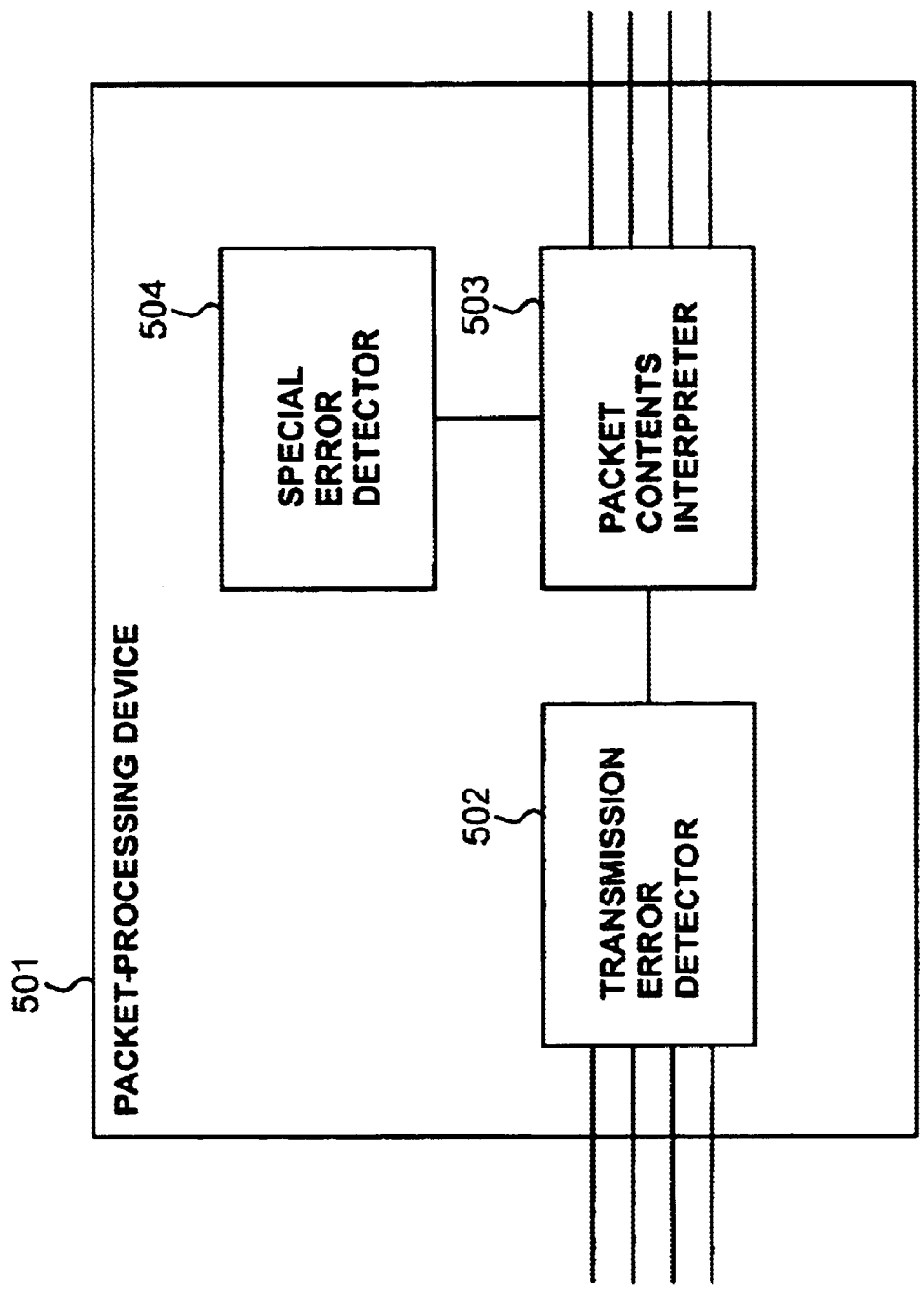
FIG. 5 shows a block diagram of the second embodiment.

Description will be made about the second embodiment of the present invention. The second embodiment is shown in FIG. 5 as a packet-processing device 501.

The packet-processing device 501 comprises a transmission error detector 502, a packet contents interpreter 503 and a special error detector 504.

The transmission error detector 502 detects and corrects transmission errors in the statement included in the packet. The statement prescribes the method for processing the packet. Next, the statement including no error or corrected by the transmission error detector 502 and data included in the packet are sent to the packet contents interpreter 503. It is elective to detect transmission error in the data.

The packet contents interpreter 503 executes processes, such as transmission, disposal and partial rewriting of a packet The special error detector 504 is activated by the packet contents interpreter 503 and executes detection and correction of transmission errors.

Next, description will be made about the operation of the packet-processing device 501 with reference to FIG. 6. FIG. 6 shows a structure of the packet transmitted by the packet-processing device 501.

Figure 6A:
FIG. 6 shows a structure of the packet transmitted by the, packet-processing device 501.
Figure 6B:
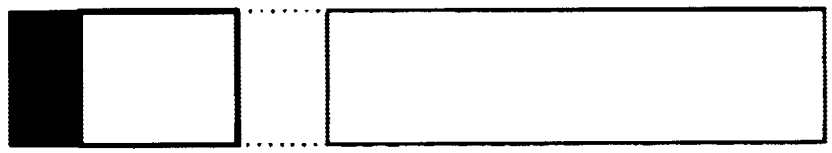

FIG. 6A shows a packet structure that the packet is divided into a plurality of areas for error detection. Each of the error detection areas comprises an error detection start signal, an area length information signal and a check code.

When the packet arrives at the packet-processing device 501, the transmission error detector 502 reads the error detection start signal and the area length information signal from the packet and start computing for error detection in the area predetermined in the area length information signal.

Until the transmission error detector 502 receives the signal in correspondence with the area length information signal, the transmission error detector 502 reads the statement and data in the packet. After calculating for error detection, the transmission error detector 502 reads the check code from the packet and compares the calculation result to the check code.

If the calculation result is correct, namely the statement or the data contents are judged as being correct, the transmission error detector 502 sends the statement/data contents to the packet connects interpreter 503.

If the calculation result is correct, the procedure of the packet-processing device 501 further branches away to two ways. If the error detection area accommodates the top statement of the packet, the process executed in relation to the packet is undecided so that the transmission error detector 502 destructs the packet. If the error detection area accommodates the following statement (the second and later statement) of the packet or data, the transmission error detector 502 process a notice that an error is detected in the statement or data. When the packet contents interpreter 503 receives the notice, the packet contents interpreter 503 the packet contents interpreter 503 informs of the notice the preceding statements to which resources have been already allocated and calls a statement for dealing with error occasion.

In this embodiment, the packet structure predetermines that the top area of a packet accommodates a statement prescribing the method for processing the packet. Consequently, it is unnecessary to consider the case that the top area of a packet accommodates data. Further, although a check code follows the corresponded statement or data in the above description, it is able to locate a check code before the error detection start signal and area length information signal. In this case, the transmission error detector 502 temporarily stores the check code.

According to this embodiment, a packet-processing device starts executing a statement described in a packet before receiving the whole of the packet. As a result, a delay time becomes short between a reception time of a packet and a start time to executing the statements in the packet. And more, the top area of a packet may accommodate a program for processing the error that occurs in the following areas. For example, when the transmission error detector 502 sends a notice that an error is detected in a data area and that the data are tolerant about transmission error, the packet contents interpreter 503 may ignore the notice.

(3) The Third Embodiment

Description will be made about the third embodiment of the present invention. The third embodiment is different from the second embodiment in packet structure. The statement of the top in a packet shown in either FIG. 6A or FIG. 6B comprises error detection start signal and area length information signal. However, there is no area for error detection start signal and area length information signal in the packet structure shown in FIG. 6B. In the third embodiment, error detection is calculated on the basis of statements in the packet contents.

In the third embodiment, when a packet is transmitted to the packet-processing device 501, error detection to the top statement is executed at the transmission error detector 502 like as the second embodiment. However, error detection to the rest of the packet is not executed at the transmission error detector 502. The error detection to the rest is executed according to the statements in the packet contents.

The statement for the error detection is described so as to activate the special error detector 504 with direction of start position and length of calculation for the error detection. After receiving the statement, the packet contents interpreter 503 interprets the statement and actives the special error detector 504. The calculation result by the special error detector 504 is received by the packet contents interpreter 503. And then, the packet contents interpreter 503 sends the calculation result to the preceding statements. Referring to the calculation result, the packet contents interpreter 503 calls the statement for dealing with error in necessity.

In addition to the effect of the second embodiment, the third embodiment further provides the effect that the packet-processing device 501 can check one packet by two methods of detecting transmission errors. Firstly, the packet-processing device 501 checks a packet by the transmission error detector 502. Secondary, if error-free packet transmission is requested, the packet may comprise larger area for much more information for error recovery and the special error detector 504 may execute the method of error detection and correction in correspondence with the much more information. To the contrary, if the packet is tolerant to errors, the packet may comprise smaller area for the information and the special error detector 504 may execute the lower performance method. Consequently, the third embodiment provides the best error detection/correction method for packet transmission to each packet.

According to the mentioned above, firstly, the packet-processing device of the present invention can predict the time to finish processing a packet when the packet-processing device receives the packet. Namely, the packet-processing device can calculate the time that the allocated resources (such as buffers, resistors) would be released at the latest. This shows that the packet-processing device can easily process packets that are continuously sent to the packet-processing device. Consequently, the packet-processing device can easily process packets like a pipeline fashion. Secondly, the packet-processing device can process a packet like a pipeline fashion. This is because the packet-processing device can start detecting error when the packet-processing device receives a part of a packet. Thus, processing each packet can be also executed in the packet-processing device in a pipeline fashion And finally, the packet-processing device of the invention can reduce a capacity of buffers to store packet contents. In this invention, a received part of a packet may be processed one by one so that the input buffer does not have to store the whole of the packet, for example. The input buffer may have a capacity enough to process a part of a packet. Furthermore, after receiving a packet, the packet-processing device can allocate the resources to the next packet. When the packet-processing device receives the last part of a packet, the packet-processing device finishes allocating the resources to the packet so that the packet-processing device can allocate the rest of the resources to the next packet. Consequently, the present invention decreases the amount of buffers to construct a packet-processing device and as the result the present invention provides a packet-processing device with lower cost.

What is claimed is:

1. A packet-processing device operable as an active node in an active network to allocate a packet to a resource, comprising a timing measuring unit for measuring a predetermined duration designated for executing the program contained in a packet to process the packet itself; and a release unit for releasing the resource when the predetermined duration designated in the packet lapses.

2. A packet-processing device as claimed in claim 1, wherein resource allocation concerned with other packets than the packet is maintained even if the predetermined duration designated in the packet lapses.

3. A method for use in an active node included in an active network to allocate a sequence of packets received by the active node, comprising the steps of:

(1) receiving each packet of the sequence;

(2) allocating each packet to a part of the resources by processing the packet sequence;

(3) scheduling a duration available for the part of the resources that is used to execute the program contained in a packet to process the packet itself;

(4) measuring the duration; and (5) releasing the part of the resources with the remaining parts of the resources unreleased.

4. A method as claimed in claim 3, wherein resource allocation concerned with the remaining packets is maintained at the step (5).

5. A packet-processing device operable as an active node in an active network to allocate a sequence of packets to resources coupled to the active node, comprising:

a packet input unit coupled to at lease one input line, for detecting packets bounds of inputted packets;

a resource manager for managing the resources by processing the packets;

a resource management table for recording a relation between the packets and resources allocated in the packets;

a packet processor for processing packet contents of the packet sent from the packet input unit; and a packet output unit coupled to at least one output line, for outputting packets sent from the packet processor to the at least one output line, the packet-processing device being operable to process each packet according to the packet contents;

the resource manager deciding a finish time to finish processing each packet on the basis of a time determined by the packet input unit and recording the finish time in the resource management table;

the packet processor discontinuing processing packet contents at the finish time of each packet unless the packet processor finished processing the packet.

6. A packet-processing device as claimed in claim 5, further comprising a interpacket process manager for managing a relationship among the packets included in the packet sequence, wherein processing is continuously executed in the packet processor in connection with the packet contents of each packet which is managed by the interpacket process manager unless the packet processor finishes processing the packet.

* * * * *